(12) United States Patent
Ficyk

(10) Patent No.: US 10,920,820 B2
(45) Date of Patent: Feb. 16, 2021

(54) NOISE REDUCING CABLE SPLITTER

(71) Applicant: Leggett & Platt Canada Co., Halifax (CA)

(72) Inventor: Eugene John Ficyk, Livonia, MI (US)

(73) Assignee: LEGGETT & PLATT CANADA CO., Halifax (CA)

(*) Notice: Subject to any disclaimer, the term of this patent is extended or adjusted under 35 U.S.C. 154(b) by 112 days.

(21) Appl. No.: 16/172,409

(22) Filed: Oct. 26, 2018

(65) Prior Publication Data
US 2020/0132108 A1     Apr. 30, 2020

(51) Int. Cl.
| F16C 1/10 | (2006.01) |
| E05B 79/20 | (2014.01) |
| E05B 85/12 | (2014.01) |
| F16C 1/26 | (2006.01) |

(52) U.S. Cl.
CPC .............. *F16C 1/106* (2013.01); *E05B 79/20* (2013.01); *F16C 1/108* (2013.01); *E05B 85/12* (2013.01); *F16C 1/101* (2013.01); *F16C 1/262* (2013.01)

(58) Field of Classification Search
CPC .. F16C 1/106; F16C 1/108; F16C 1/16; F16C 1/262; F16C 1/101; F16C 1/10; E05B 79/20; E05B 85/12; Y10T 74/20426; Y10T 74/2045; Y10T 74/20462
See application file for complete search history.

(56) References Cited

U.S. PATENT DOCUMENTS

| 3,744,339 | A | * | 7/1973 | Martinson | F16C 1/22 74/500.5 |
| 4,811,620 | A | | 3/1989 | Old et al. | |
| 5,138,898 | A | * | 8/1992 | Pospisil | F16C 1/101 74/502.6 |
| 5,495,790 | A | * | 3/1996 | Greiner | B60R 22/4619 188/375 |
| 5,860,319 | A | | 1/1999 | Via | |

(Continued)

FOREIGN PATENT DOCUMENTS

| CN | 103395379 B | 12/2015 |
| EP | 2400171 A1 | 12/2011 |

(Continued)

OTHER PUBLICATIONS

EPO Translation of the Description of JP 2001208036 A, Nemoto, Aug. 3, 2001. (Year: 2020).*

(Continued)

*Primary Examiner* — Daniel D Yabut
(74) *Attorney, Agent, or Firm* — Michael Best & Friedrich LLP

(57) ABSTRACT

A latching system includes a first lever connected to a first cable having a first cable end, a second lever connected to a second cable having a second cable end, a latch connected to a third cable having a third cable end, and a cable splitter assembly. The cable splitter assembly has a housing with a first end and a second end and a body with an interior surface defining an interior chamber. A carriage is configured to translate within the interior chamber. The carriage includes a carriage body with a plurality of cavities arranged to seat the respective first, second, and third cable ends and a plurality of resilient arms integrally formed as one piece with the carriage body.

15 Claims, 5 Drawing Sheets

(56) References Cited

U.S. PATENT DOCUMENTS

| | | | |
|---|---|---|---|
| 6,056,020 A * | 5/2000 | Malone | F16C 1/101 |
| | | | 138/155 |
| 6,148,689 A | 11/2000 | Uneme | |
| 6,209,414 B1 | 4/2001 | Uneme | |
| 6,263,757 B1 | 7/2001 | Kawahara | |
| 6,898,996 B2 | 5/2005 | Freund et al. | |
| 8,511,201 B2 | 8/2013 | Cho et al. | |
| 8,746,108 B2 | 6/2014 | Choi et al. | |
| 8,864,193 B2 | 10/2014 | Mori et al. | |
| 9,790,728 B2 | 10/2017 | Arimoto et al. | |
| 2011/0041644 A1 | 2/2011 | Choi et al. | |
| 2012/0192669 A1* | 8/2012 | Lo | B62L 3/02 |
| | | | 74/471 R |
| 2013/0247709 A1* | 9/2013 | Sano | F16C 1/101 |
| | | | 74/502.6 |
| 2016/0131180 A1 | 5/2016 | Hong et al. | |
| 2017/0077688 A1 | 3/2017 | Metzler et al. | |
| 2017/0198743 A1 | 7/2017 | Kwon et al. | |
| 2017/0254354 A1 | 9/2017 | Carabalona | |
| 2018/0045240 A1* | 2/2018 | Runde | A61K 31/7072 |
| 2018/0119723 A1* | 5/2018 | Naoi | F16C 1/101 |
| 2018/0216657 A1 | 8/2018 | Yoshida | |

FOREIGN PATENT DOCUMENTS

| | | | | |
|---|---|---|---|---|
| JP | 08277830 A | * | 10/1996 | F16C 1/106 |
| JP | 2000186580 A | * | 7/2000 | F16C 1/101 |
| JP | 2001208036 A | * | 8/2001 | F16C 1/101 |
| WO | 2012/169495 A1 | | 12/2012 | |
| WO | 2017/110353 A1 | | 6/2017 | |

OTHER PUBLICATIONS

International Search Report and Written Opinion for Application No. PCT/CA2019/000146 dated Dec. 10, 2019 (7 pages).

* cited by examiner

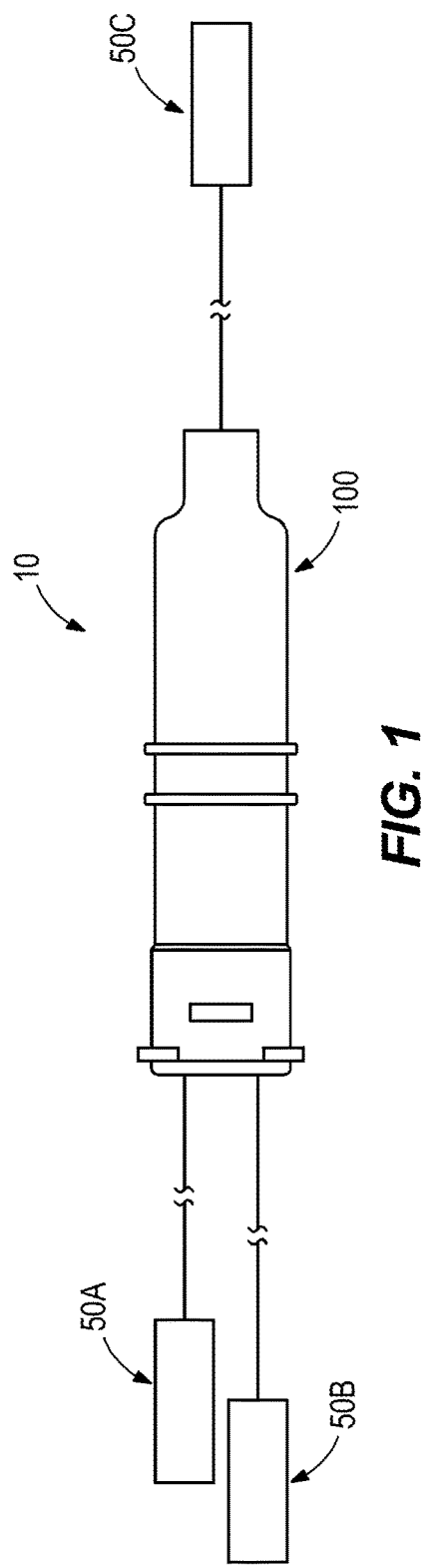
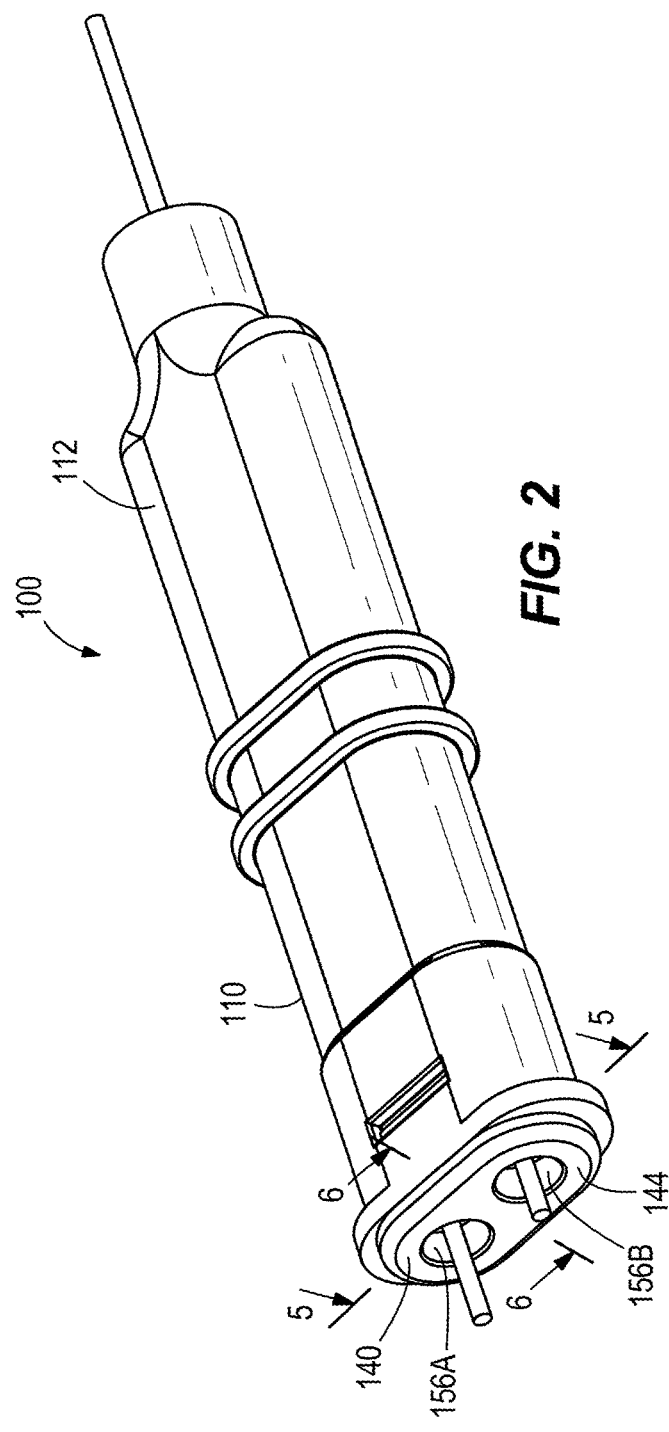

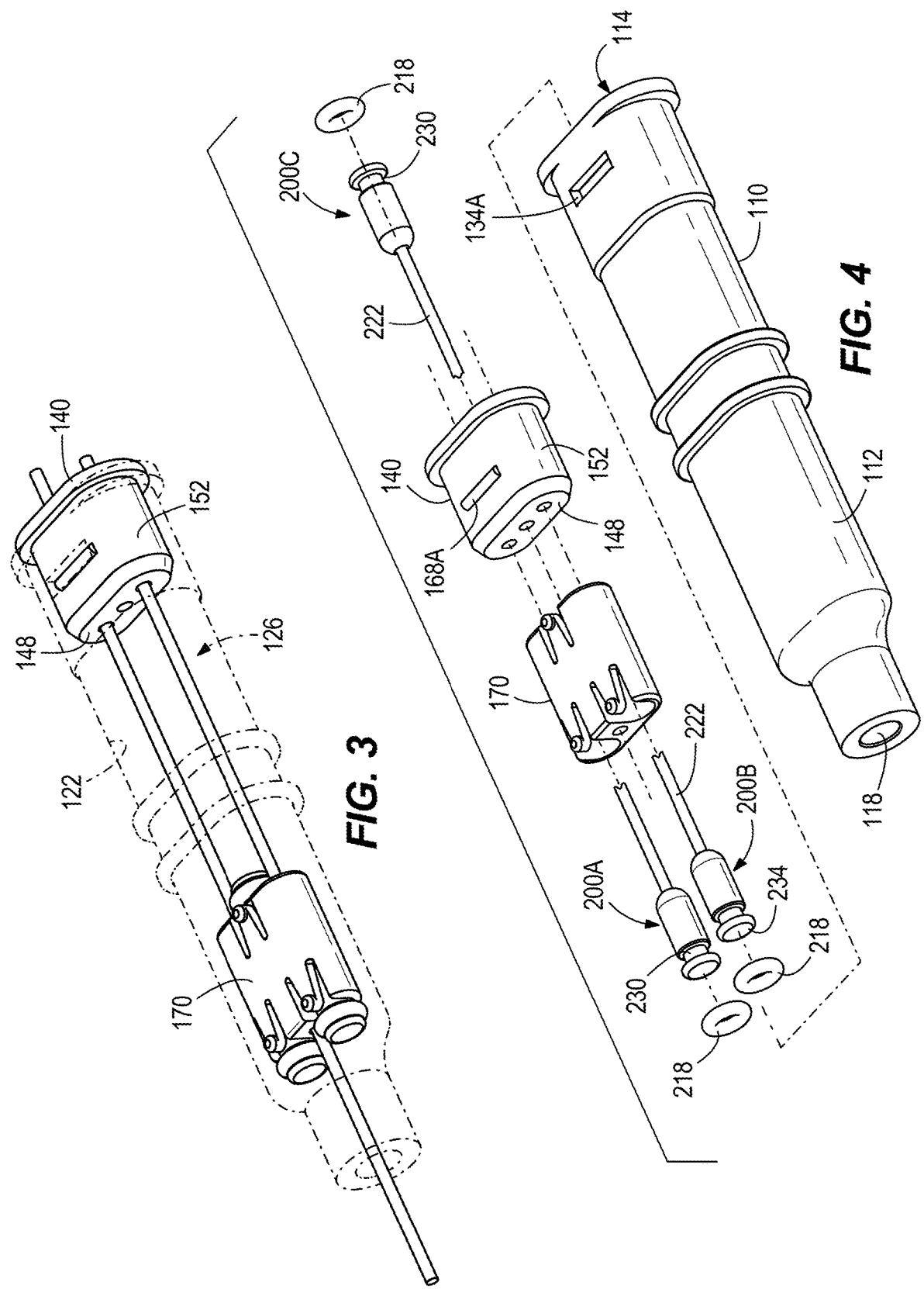

US 10,920,820 B2

NOISE REDUCING CABLE SPLITTER

BACKGROUND

The present disclosure relates to a multi-cable splitter assembly, such as those used in connection with interior automotive cables.

Many automotive systems such as door and seat latches use cable splitters to efficiently function. Multi-cable splitter assemblies, however, tend to have components that slide or are otherwise loose within the assembly casing, and in current assemblies this produces objectionable noise like buzz, squeak, and rattle (BSR).

SUMMARY

A latching system includes a first lever connected to a first cable having a first cable end, a second lever connected to a second cable having a second cable end, a latch connected to a third cable having a third cable end, and a cable splitter assembly. The cable splitter assembly has a housing with a first end and a second end and a body with an interior surface defining an interior chamber. A carriage is configured to translate within the interior chamber. The carriage includes a carriage body with a plurality of cavities arranged to seat the respective first, second, and third cable ends and a plurality of resilient arms integrally formed as one piece with the carriage body.

A carriage for a cable splitter assembly, in which the assembly includes a housing containing an interior chamber and the carriage is configured to translate within the interior chamber, includes a carriage body with a plurality of recesses. Each recess is arranged to seat a cable terminal end and forms, in conjunction with the carriage body, a resilient arm.

A cable splitter subassembly includes a housing having a first end and a second end and a body with an interior surface defining a bounded interior chamber. A carriage is configured to translate within the bounded interior chamber and has a carriage body with a plurality of cavities. Each cavity is arranged to seat a cable terminal end and a plurality of resilient arms extend from the carriage body. Each arm includes a contact surface configured to contact a portion of the interior chamber during translation of the carriage within the housing.

BRIEF DESCRIPTION OF THE DRAWINGS

FIG. 1 is a view of a lever system including a cable splitter assembly.

FIG. 2 is a perspective view of the cable splitter assembly of FIG. 1.

FIG. 3 is a perspective view of the interior of the cable splitter assembly of FIG. 1.

FIG. 4 is an exploded view of the cable splitter assembly of FIG. 1.

DETAILED DESCRIPTION

Figure 5:
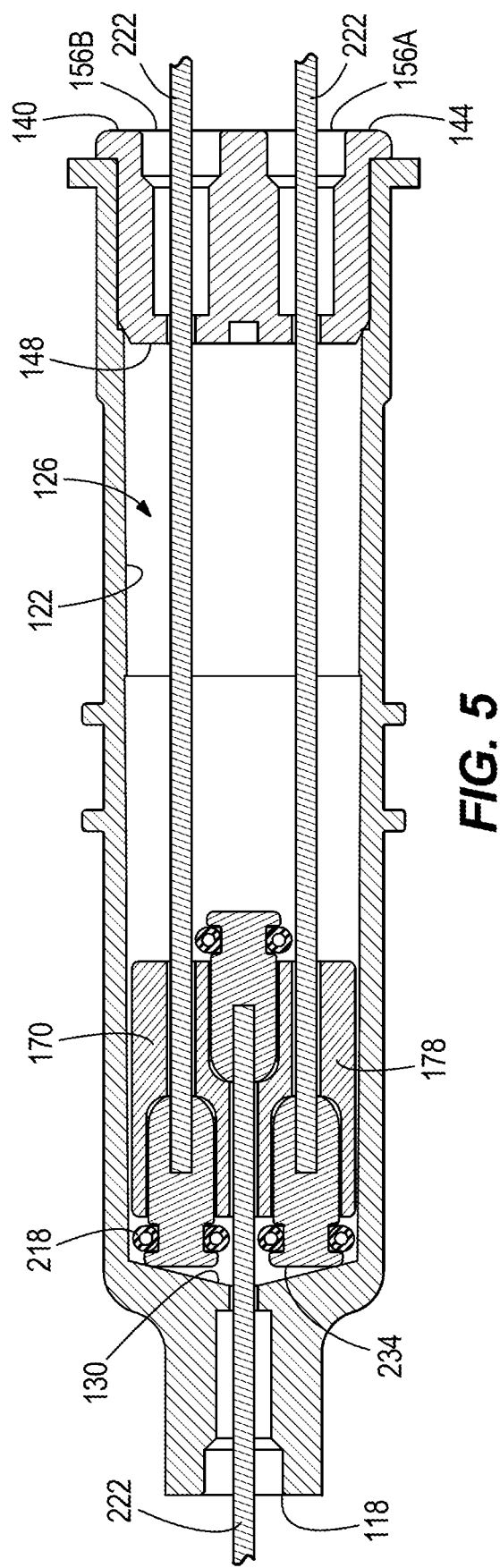
FIG. 5 is a cross-sectional view of the cable splitter taken along line 5-5 of FIG. 2.
Figure 6:
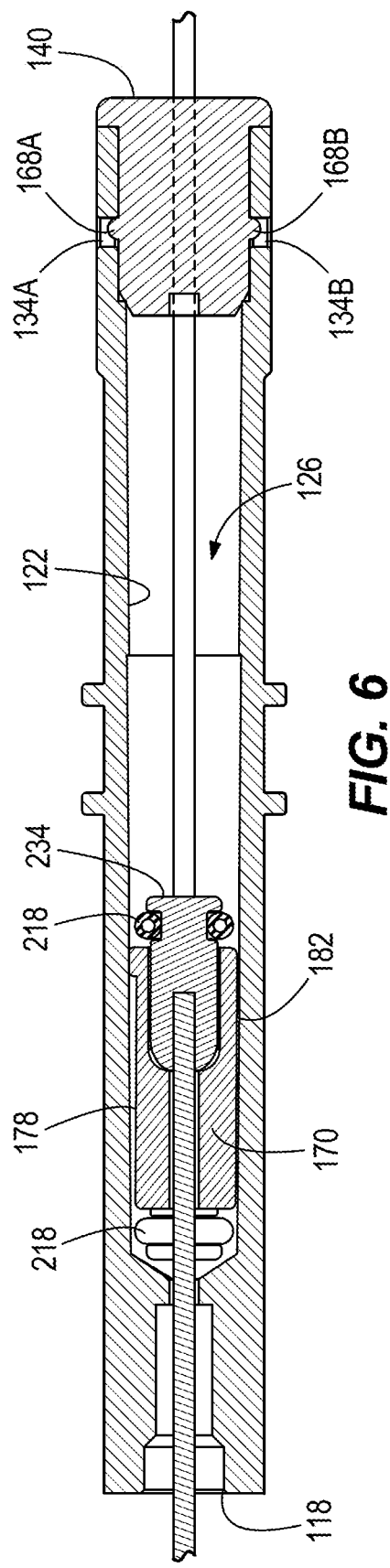
FIG. 6 is a cross-sectional view of the cable splitter taken along line 6-6 of FIG. 2.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

FIG. 1 depicts a lever/latch cable system 10 comprising a plurality (three illustrated) of tensioning devices 50A-50C connected by a cable splitter assembly 100. The devices can be a combination of levers, latches, or other tension driven devices as the application demands. Referring also to FIGS. 2-4, the cable splitter assembly 100 includes a housing 110, a cap 140, a carriage or carrier 170, and three cable assemblies 200A-200C.

The housing 110 includes a housing body 112 generally elongated in shape from a first open end 114 to a second open end 118. In particular, the body 112 "necks" down near the second open end 118 such that the second open end 118 is a generally cylindrical portion of the body 112 having a lesser width than the remainder of the body 112 in at least one direction. The body 112 has an interior surface 122, which defines an interior chamber 126 therein and includes a stop surface 130 (FIG. 5) adjacent the second open end 118. A pair of apertures 134A, 134B adjacent the first open end 114 extend through the body 112 to the interior chamber 126.

With continued reference to FIGS. 2-4, the cap 140 includes a first end 144, a second end 148, an exterior surface 152, and a pair of channels 156A, 156B therethrough from the first end 144 to the second end 148. The first end 144 is sized to cover the opening of the first open end 114. The exterior surface 152 presents an opposing pair of protrusions 168A, 168B.

Figure 7A:
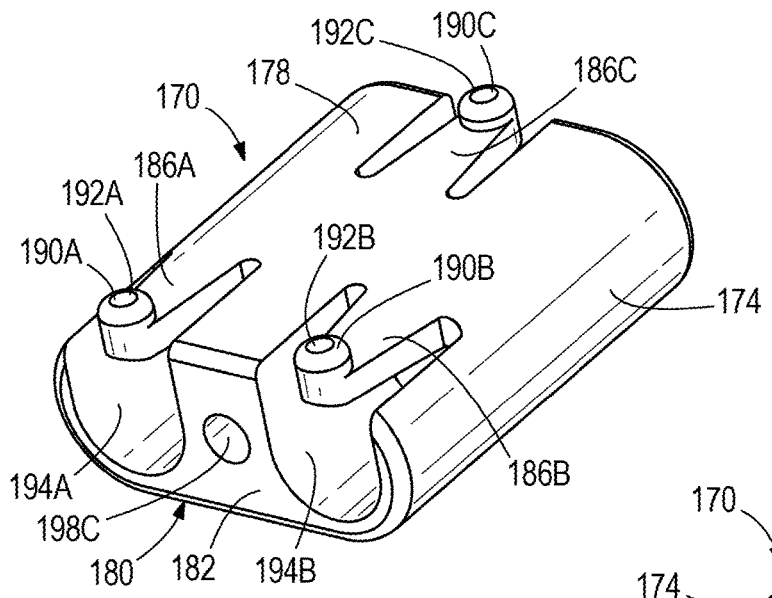
FIGS. 7A and 7B are perspective views of a carriage member of the cable splitter assembly of FIG. 1.
Figure 7B:
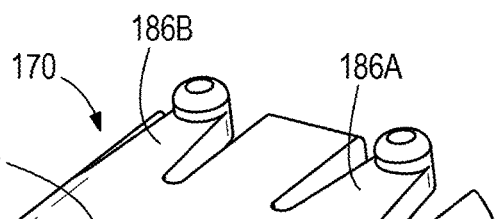

The carriage 170, further illustrated in FIGS. 7A and 7B, includes a body 174, a first side 178, a second side 180, a first end 182, and a second end 184. Integrally formed as one piece with the body 174 and with the first side 178 are resilient or flexible tabs or arms 186A-186C, each with a knob or contact member 190A-190C, respectively, projecting away from the first side 178 and with a contact surface 192A-192C. Alternatively, the body 174 can be described as including resilient or flexible arms 186A-186C extending therefrom and having contact members 190A-190C. Yet alternatively, the body 174 includes cavities or recesses 194A-194C that thereby form resilient arms 186A-186C of the body 174. In some embodiments, each arm 186A, 186B, 186C is biased directionally away from the body 174. In some embodiments, each arm 186A, 186B, 186C is formed to at least partially extend away from the body 174.

The carriage 170 further includes a first channel 198A extending from the first cavity 194A to the second end 184, a second channel 198B extending from the second cavity 194B to the second end 184, and a third channel 198C extending from the third cavity 194C to the first end 182. In other words, channels 198A-198C in combination with associated cavities 194A-194C extend effectively through the body 174 from the first end 182 to the second end 184.

Figure 8:
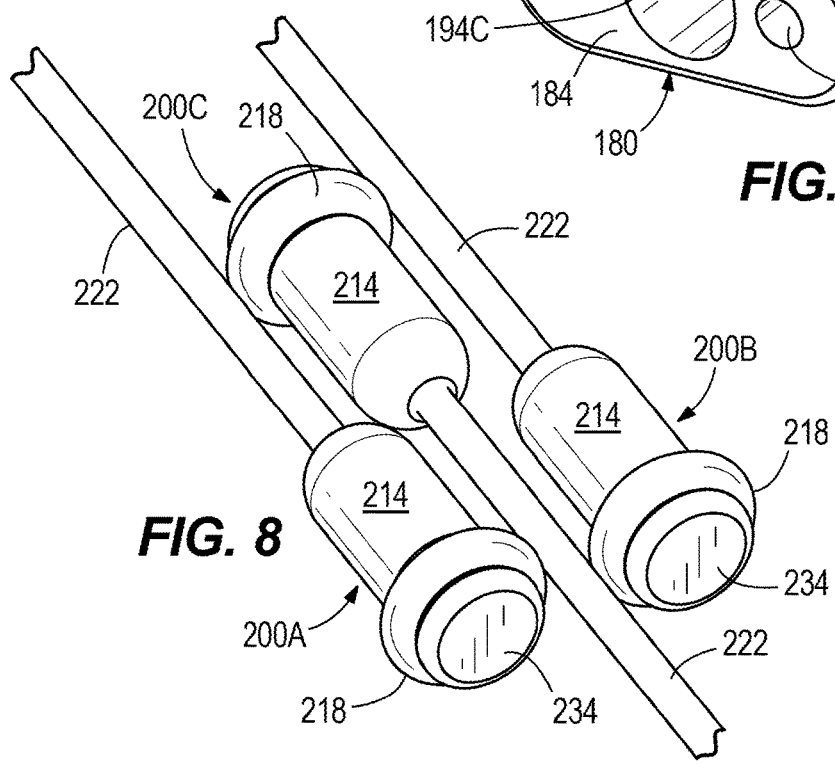
FIG. 8 is a perspective view of a cable sub assembly of the cable splitter assembly of FIG. 1.

FIG. 8 shows the three cable assemblies 200A-200C. Each cable assembly includes a terminal end or terminal 214, a vibration or noise reducing component or bumper or ring 218, and a cable 222. The terminal includes a groove or channel 230 near or adjacent a terminal end 234 of each terminal 214. The bumper 218 is an annular member or toroidal member made of elastomeric or other relatively soft or resilient material and configured to at least partially fit within an associated groove 230 of a terminal 214. In other embodiments, the bumper 218 may be a rubber or elastomeric cap, an over molded cap, or a collar-like structure about a portion of the terminal 214. The terminal ends 234 are sized such that they cannot slide within a channel 198.

In assembly, the cable 222 of assembly 200C passes through open end 118 of the housing 110, through the housing 110, and through channel 198C of the carriage 170, at which point it is joined or coupled to the associated terminal 214 in a conventional manner. The cables 222 of assemblies 200A and 200B likewise pass through channels 156A, 156B, respectively, of the cap 140 and thereafter through channels 198A, 198B, respectively, of the carriage 170, at which point they are joined to respective terminals 214. Bumpers 218 can be assemble onto terminals 214 beforehand or afterward. The assemblies 200A-200C and carriage 170 are positioned within the chamber 126 and the cap 140 inserted into the first open end 114. Specifically, the cap 140 is configured to cover the opening of the first open end 114. The exterior surface 152 of the cap 140 contacts the interior surface 122 of the housing 110, and the cap 140 is aligned so that each protrusion 168A, 168B on the exterior surface 152 is received by an aperture 134A, 134B of the housing 110, securing the cap 140 in place. In this embodiment, the cap 140 is removably coupled to the housing 110 via a snapping mechanism. In other embodiments, the cap 140 may be press fit to the housing 110, or hinged, or clasped, or otherwise removably coupled to the housing 110.

Once assembled, the carriage 170 is confined between the stop surface 130 and the second end 148 of the cap 140. The cables 222 may be previously connected to the respective tensioning devices 50A-50C or may be connected at any time during or after assembly of the splitter assembly 100.

In operation, the carriage 170 is configured to slide within the interior chamber 126 between the stop surface 130 and the second end 148 of the cap 140 dependent on forces applied to the cables 222.

Figure 9A:
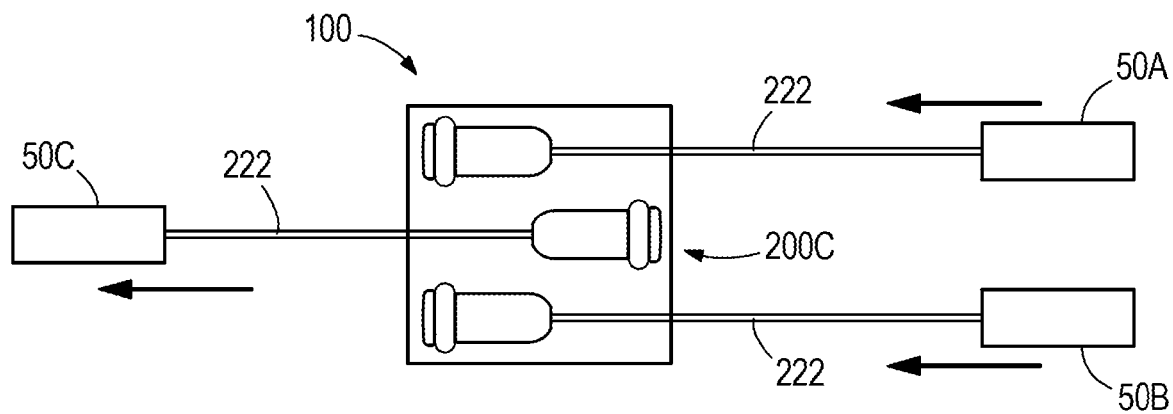
FIGS. 9A-9C are schematic diagrams of the cable splitter assembly of FIG. 1 in use.

Specifically, referring to FIG. 9A, tensioning device 50C is a lever and tensioning devices 50A and 50B are latches. In this arrangement, pulling lever 50C results in cable assembly 200C pulling splitter assembly 100 leftward (in this reference frame), thereby pulling both of latches 50A, 50B. As carriage 170 translates within interior chamber 126, the contact surfaces 192A-192C of flexible tabs or arms 186A-186C, which are each disposed between a respective arm and the interior surface 122, lightly contact a portion of interior surface 122 to limit or impede non-translatory movement of the carriage 170 within the housing 110, i.e., hindering any non-linear or non-translatory movement (movement not aligned with the direction of tension of cable assembly 200C) or impact between surfaces of the carriage 170 and the interior surface 122. The flexible arms 186A-186C therefore operate to minimize or eliminate clearance between the carriage 170 and the interior surface 122.

Figure 9B:
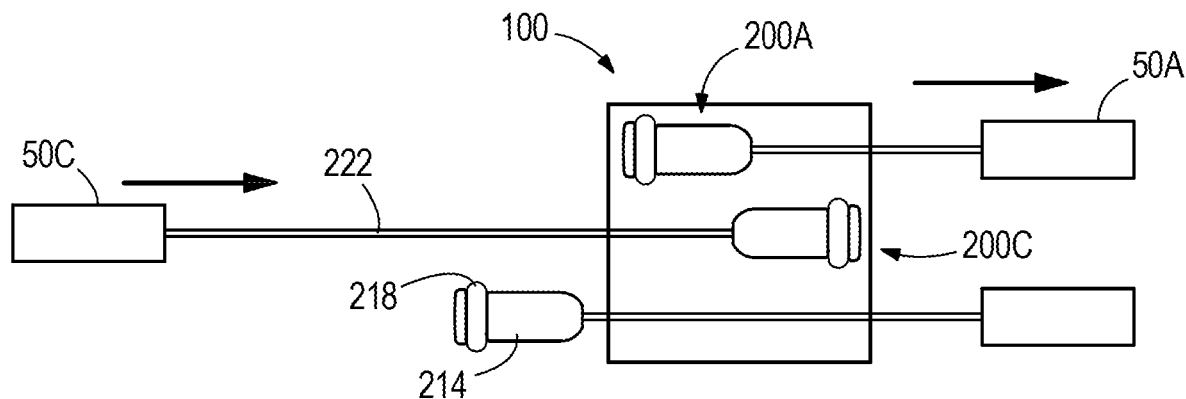
Figure 9C:
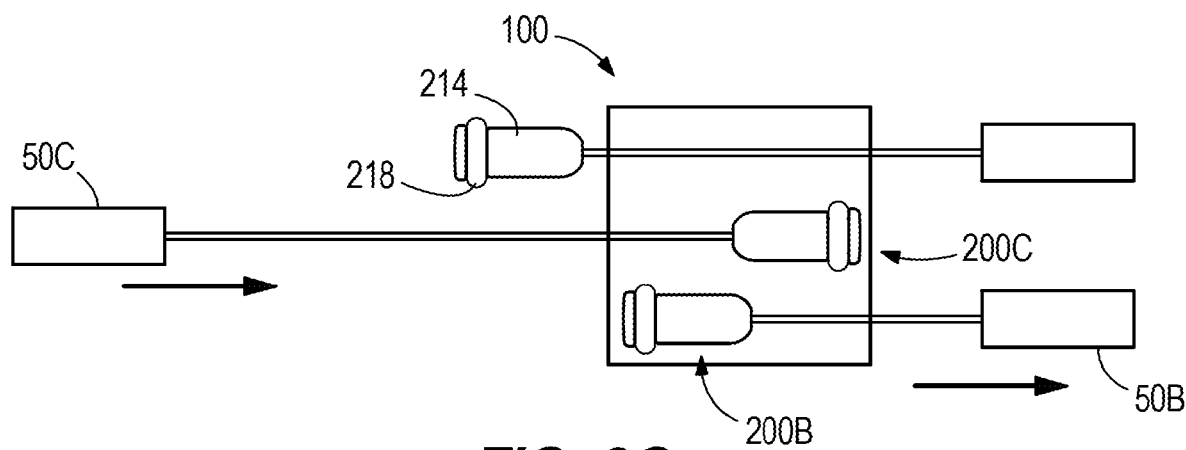

Referring to FIGS. 9B-9C, tensioning devices 50A and 50B are levers and tensioning device 50C is a latch. As shown in FIG. 9B, pulling lever 50A rightward causes cable assembly 200A to pull carriage 170 rightward, which brings with it cable assembly 200C and latch 50C. The flexible tabs or arms 186A-186C cooperate with the interior surface 122 as previously described. Moreover, cable assembly 200B, and more precisely associated terminal 214, releases or slides from its seated position within the carriage 170 (essentially remaining in place) and may thereby be loose within the interior chamber 126. Bumper 218, which protrudes from the normal contour of the terminal 214, reduces the noise or vibration associated with any contact between the terminal 214 and the interior surface 122. Pulling lever 50B (FIG. 9C) results in the same effect between the terminal 214 of cable assembly 200A and the interior surface 122.

In the illustrated embodiment, the cable splitter assembly 100 contains a total of three cable assemblies 200A-200C arranged in a two to one conversion structure. In other embodiments, however, the cable splitter assembly 100 may contain just two cables with a one to one structure, or any other number of cables in a similar conversion structure (for example, six cables, with two on one side and four on the other, three on one side and three on the other, one on one side and five on the other, etc. with all other parts scaled and adapted accordingly, i.e., a carriage with a sufficient number of cavities and resilient arms as previously described.

Various features of the disclosure are set forth in the following claims.

What is claimed is:

1. A latching system comprising:
   a first lever connected to a first cable having a first cable end;
   a second lever connected to a second cable having a second cable end;
   a latch connected to a third cable having a third cable end; and
   a cable splitter assembly, the assembly including
      a housing having a first end and a second end and a body with an interior surface defining an interior chamber;
      a carriage configured to translate within the interior chamber, the carriage having a carriage body with a plurality of cavities arranged to seat the respective first, second, and third cable ends and a plurality of resilient arms integrally formed as one piece with the carriage body.

2. The latching system of claim 1, wherein the carriage body includes a first side and an opposing second side, and wherein the plurality of resilient arms are integrally formed as part of the first side.

3. The latching system of claim 2, wherein each resilient arm of the plurality of resilient arms includes a contact surface disposed between the respective resilient arm and the interior surface.

4. The latching system of claim 2, wherein each resilient arm of the plurality of resilient arms includes a contact member extending away from the first side.

5. The latching system of claim 1, wherein the carriage further includes a first end and an opposing second end, wherein the carriage body further includes a plurality of channels, each channel in communication with one cavity of the plurality of cavities.

6. The latching system of claim 5, wherein each cavity is formed at one of the first end or the second end, and wherein an associated channel extends from the other of the first end or second end to the cavity.

7. The latching system of claim 1, further including
   a first terminal at the first cable end;
   a second terminal at the second cable end; and
   a third terminal at the third cable end,
   wherein each of the first, second, and third terminals is configured to sit within a respective cavity of the plurality of cavities and includes a vibration-reducing component.

8. The latching system of claim 7, wherein each vibration-reducing component is in the form of a ring positioned at least partially around a portion of each respective terminal.

9. The latching system of claim 8, wherein each ring is formed of an elastomeric material.

10. A cable splitter subassembly comprising:
   a housing having a first end and a second end and a body with an interior surface defining a bounded interior chamber;
   a carriage configured to translate within the bounded interior chamber, the carriage having a carriage body with a plurality of cavities, each cavity arranged to seat a cable terminal end and opening to a first end of the carriage body or a second end of the carriage body opposite the first end, and a plurality of resilient arms extending from the carriage body, each arm including a contact surface configured to contact a portion of the interior chamber during translation of the carriage within the housing;
   a first cable extending through the first end of the housing and the first end of the carriage body, wherein the first cable is connected to a first cable terminal end configured to be seated in a respective one of the pluralities of cavities having an opening in the second end of the carriage body through which the first cable terminal is movable during operation of the cable splitter subassembly; and
   a second cable extending through the first end of the housing and the first end of the carriage body, wherein the second cable is connected to a second cable terminal end configured to be seated in a respective one of the plurality of cavities having an opening in the second end of the carriage body through which the second cable terminal end is movable during operation of the cable splitter subassembly opening.

11. The cable splitter subassembly of claim 10, wherein the second end of the housing includes an opening, the subassembly further including a cap configured to cover the opening, wherein the cap includes a plurality of cap channels extending therethrough such that in an assembled state of the cap with the housing the bounded interior chamber is in communication with an environment external to the housing.

12. The cable splitter subassembly of claim 11, wherein the carriage body further includes a plurality of channels, each channel in communication with a cavity of the plurality of cavities.

13. The cable splitter subassembly of claim 10, wherein each contact surface is a portion of a contact member formed at the end of each arm.

14. A cable splitter subassembly comprising:
   a housing having a first end and a second end and a body with an interior surface defining a bounded interior chamber;
   a carriage configured to translate within the bounded interior chamber, the carriage having a plurality of cavities, each cavity arranged to seat a cable terminal end, and a plurality of resilient arms extending from the carriage, each arm including a contact surface configured to contact a portion of the interior chamber during translation of the carriage within the housing;
   a first cable extending through the first end of the housing and a first end of the carriage, wherein the first cable is connected to a first cable terminal end configured to be seated in a respective one of the plurality of cavities;
   a second cable extending through the second end of the housing and a second end of the carriage opposite the first end of the carriage, wherein the second cable is connected to a second cable terminal end configured to be seated in a respective one of the plurality of cavities that opens to the first end of the carriage; and
   a third cable extending through the second end of the housing and the second end of the carriage, wherein the third cable is connected to a third cable terminal end configured to be seated in a respective one of the plurality of cavities that opens to the first end of the carriage,
   wherein the carriage is configured such that pulling the first cable to move the carriage toward the first end of the housing moves the second and third cable terminal ends toward the first end of the housing, pulling the second cable to move the carriage toward the second end of the housing moves the first cable terminal end toward the second end of the housing while the third terminal cable end remains stationary, and pulling the third cable to move the carriage toward the second end of the housing moves the first cable terminal end toward the second end of the housing while the second terminal cable end remains stationary.

15. The carriage splitting assembly of claim 14, wherein each contact surface is formed by a contact member extending away from carriage body.

* * * * *